United States Patent
Edwards

[11] Patent Number: 6,123,099
[45] Date of Patent: *Sep. 26, 2000

[54] PINCH TUBE TANK LEVEL CONTROL VALVE WITH SNAP-ACTION SHUTOFF

[75] Inventor: Harry W. Edwards, Barrington, Ill.

[73] Assignee: George S. Cole & Associates, Incorporated, Pebble Beach, Calif.

[*] Notice: This patent is subject to a terminal disclaimer.

[21] Appl. No.: 09/233,232

[22] Filed: Jan. 19, 1999

Related U.S. Application Data

[63] Continuation-in-part of application No. 09/074,815, May 8, 1998, Pat. No. 5,896,887, which is a continuation-in-part of application No. 08/878,982, Jun. 19, 1997, abandoned.

[51] Int. Cl.[7] .............................. F16K 31/26; F16K 7/06
[52] U.S. Cl. ...................... 137/416; 137/418; 137/422; 137/432; 137/445; 137/446; 137/451
[58] Field of Search ..................... 137/414, 416, 137/418, 420, 422, 430, 432, 434, 445, 446, 451; 251/7, 9

[56] References Cited

U.S. PATENT DOCUMENTS

| | | | |
|---|---|---|---|
| 520,150 | 5/1894 | Turner | 137/446 |
| 615,386 | 12/1898 | Gleason | 137/446 |
| 748,492 | 12/1903 | Foss | 137/446 |
| 768,595 | 8/1904 | Fraser | 137/446 |
| 782,331 | 2/1905 | Fraser | 137/446 |
| 962,999 | 6/1910 | Dawson | 251/9 |
| 1,010,562 | 12/1911 | Woodward | 137/451 |
| 1,035,663 | 8/1912 | Utley | 137/446 |
| 1,161,554 | 11/1915 | Voigt | 137/418 |
| 1,170,475 | 2/1916 | Besler | 137/451 |
| 1,208,274 | 12/1916 | Besler | 137/451 |
| 1,393,384 | 10/1921 | Linstadt | 137/446 |
| 2,013,188 | 9/1935 | Reinhardt | 137/420 |
| 2,189,427 | 2/1940 | Long | 137/432 |
| 2,809,656 | 10/1957 | Goldtrap | 137/430 |
| 2,900,996 | 8/1959 | Goldtrap | 137/416 |
| 2,986,155 | 5/1961 | Doyle | 137/414 |
| 3,115,153 | 12/1963 | Delamater | 137/426 |
| 3,194,258 | 7/1965 | Grant | 137/414 |
| 3,285,277 | 11/1966 | Goldtrap | 137/414 |
| 3,321,972 | 5/1967 | Goldtrap | 137/414 |
| 3,335,747 | 8/1967 | Schipper | 137/414 |
| 3,356,460 | 12/1967 | King et al. | 137/414 |
| 3,457,947 | 7/1969 | Fitzgerald | 137/418 |
| 3,473,779 | 10/1969 | Gustafson et al. | 251/9 |
| 3,508,574 | 4/1970 | Skerritt | 137/451 |
| 3,669,138 | 6/1972 | Schoepe et al. | 137/414 |
| 3,670,751 | 6/1972 | Buswell | 137/451 |
| 3,693,649 | 9/1972 | Gordon et al. | 137/432 |
| 3,729,017 | 4/1973 | Brandelli | 137/414 |

(List continued on next page.)

FOREIGN PATENT DOCUMENTS

| | | | |
|---|---|---|---|
| 113761 | 10/0000 | Germany | 137/451 |
| 436035 | 10/1926 | Germany | 137/451 |

*Primary Examiner*—George L. Walton
*Attorney, Agent, or Firm*—Emrich & Dithmar

[57] ABSTRACT

A liquid level control apparatus for a flush tank includes an upstanding fill tube integral at its upper end with a valve housing carrying a flexible resilient pinch tube valve member. The valve housing defines a conduit which communicates with a downwardly extending tube parallel to the fill tube. A float has portions respectively receiving the fill tube and the downwardly extending tube therethrough so that the float slides vertically along the tubes as the water level in the tank varies. In one embodiment, an actuator rib on the float fits in a slot in the housing to directly engage the pinch tube valve member, and in another embodiment an actuator pivots on the housing and is coupled by linkage to the float. In the one embodiment an arresting flange on a resilient portion of the float engages an arresting flange on the fill tube for arresting upward movement of the float until the tank is full to provide a snap-action shutoff of the valve. In the other embodiment the coupling linkage includes a control mechanism having a cam slot engageable with a cam follower roller to provide the arresting and snap action.

21 Claims, 9 Drawing Sheets

U.S. PATENT DOCUMENTS

| | | | |
|---|---|---|---|
| 3,773,290 | 11/1973 | Mowery | 251/9 |
| 3,850,209 | 11/1974 | Zweigardt | 137/451 |
| 3,913,882 | 10/1975 | Moulet | 137/451 |
| 3,965,925 | 6/1976 | Gooch | 251/9 |
| 3,996,960 | 12/1976 | Martinez-Lozano | 137/451 |
| 4,186,765 | 2/1980 | Anderson | 137/414 |
| 4,247,076 | 1/1981 | Larkin | 251/7 |
| 4,286,618 | 9/1981 | Bang et al. | 137/451 |
| 4,299,248 | 11/1981 | Becker et al. | 137/414 |
| 4,341,238 | 7/1982 | Roosa et al. | 137/414 |
| 4,431,024 | 2/1984 | Gallagher | 137/413 |
| 4,600,031 | 7/1986 | Nestich | 137/432 |
| 4,655,244 | 4/1987 | Park | 137/416 |
| 4,783,859 | 11/1988 | Rozenblatt et al. | 251/9 |
| 4,842,011 | 6/1989 | Roosa | 137/414 |
| 5,007,452 | 4/1991 | Antunez | 137/414 |
| 5,090,443 | 2/1992 | Jacobsen | 137/451 |
| 5,402,823 | 4/1995 | Cole | 251/9 |

PINCH TUBE TANK LEVEL CONTROL VALVE WITH SNAP-ACTION SHUTOFF

CROSS-REFERENCE TO RELATED APPLICATIONS

This application is a continuation-in-part of U.S. application Ser. No. 09/074,815, filed May 8, 1998, now U.S. Pat. No. 5,896,887, which is, in turn, a continuation-in-part of application Ser. No. 08/878,982, filed Jun. 19, 1997, abandoned.

BACKGROUND OF THE INVENTION

The present invention relates to apparatus for controlling the liquid level in tanks and, in particular, to such apparatus for use in toilet flush tanks.

Various types of valves have utilized a flexible, resilient pinch tube as the valve member, which is controlled by a lever-type actuator engageable with the outside of the tube to pinch it closed. Such a valve is disclosed, for example, in U.S. Pat. No. 5,402,823. Pinch tube valves have heretofore been used as toilet level control valves, for example in U.S. Pat. No. 3,996,960. However, such valves have typically utilized a ball cock mechanism wherein the actuator is coupled by a long arm to a float. Such ball cock devices require considerable lateral space in the tank to accommodate the float and its arm.

It is also known to utilize flush tank level control valves with floats which encircle and ride up and down along an upright fill tube, so as to occupy less space in the tank. Such valves have heretofore utilized a poppet-type valve mechanism, which is of relatively complex construction.

It is also known to provide snap-action shutoff of flush tank level control valves by providing means for resiliently arresting the upward movement of the float short of the closed-valve position, the arresting mechanism yielding when the buoyancy force of the rising water level on the float reaches a sufficient value, for suddenly closing the valve. But such mechanisms heretofore have been relatively complex and have not been utilized with pinch tube-type valves.

SUMMARY OF THE INVENTION

It is a general object of the invention to provide an improved liquid level control apparatus for a flush tank, which avoids the disadvantages of prior level control apparatuses, while affording additional structural and operating advantages.

An important feature of the invention is the provision of a liquid level control apparatus of the type set forth, which occupies minimal space in the tank.

In connection with the foregoing feature, another feature of the invention is the provision of an apparatus of the type set forth, which is of simple and economical construction.

Still another feature of the invention is the provision of apparatus of the type set forth which can provide continuously variable flow control.

Yet another feature of the invention is the provision of an apparatus of the type set forth which minimizes the tank refill time.

In connection with the foregoing feature, a further feature of the invention is the provision of an apparatus of the type set forth which provides for a positive snap-action valve shutoff.

Certain ones of these and other features of the invention may be attained by providing a liquid level control apparatus for a flush tank containing liquid varying between highest and lowest levels and including a fill tube communicating with the tank and with a source of liquid under pressure, the apparatus comprising: a valve mechanism communicating with the fill tube and operable between open and closed conditions relative to the fill tube, a float disposed in the liquid in the tank for movement in response to changes in the liquid level in the tank, an actuator member coupled to the valve mechanism and to the float for actuating the valve mechanism between its open and closed conditions in response to movement of the float, and control mechanism including a first arresting portion integral with the float and a second arresting portion, the control mechanism being responsive to rising of the float to a predetermined stop level intermediate the highest and lowest levels for moving to a stop condition with the first arresting portion engaging the second arresting portion for mechanically arresting further upward movement of the float, the control mechanism, when in the stop condition, being responsive to a predetermined buoyancy force exerted on the arrested float when the liquid has risen substantially to the highest level for shifting to a release condition by disengagement of the first arresting portion from the second arresting portion for releasing the float and permitting the float and the actuator member to move suddenly to actuate the valve mechanism to its closed condition.

Further features of the invention may be attained by providing a level control apparatus of the type set forth, wherein the actuator member is integral with the float and the second arresting portion is disposed on the fill tube.

Other features may be attained by providing a liquid level control apparatus of the type set forth, wherein the control mechanism is disposed in actuator linkage coupling the valve mechanism to the float.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
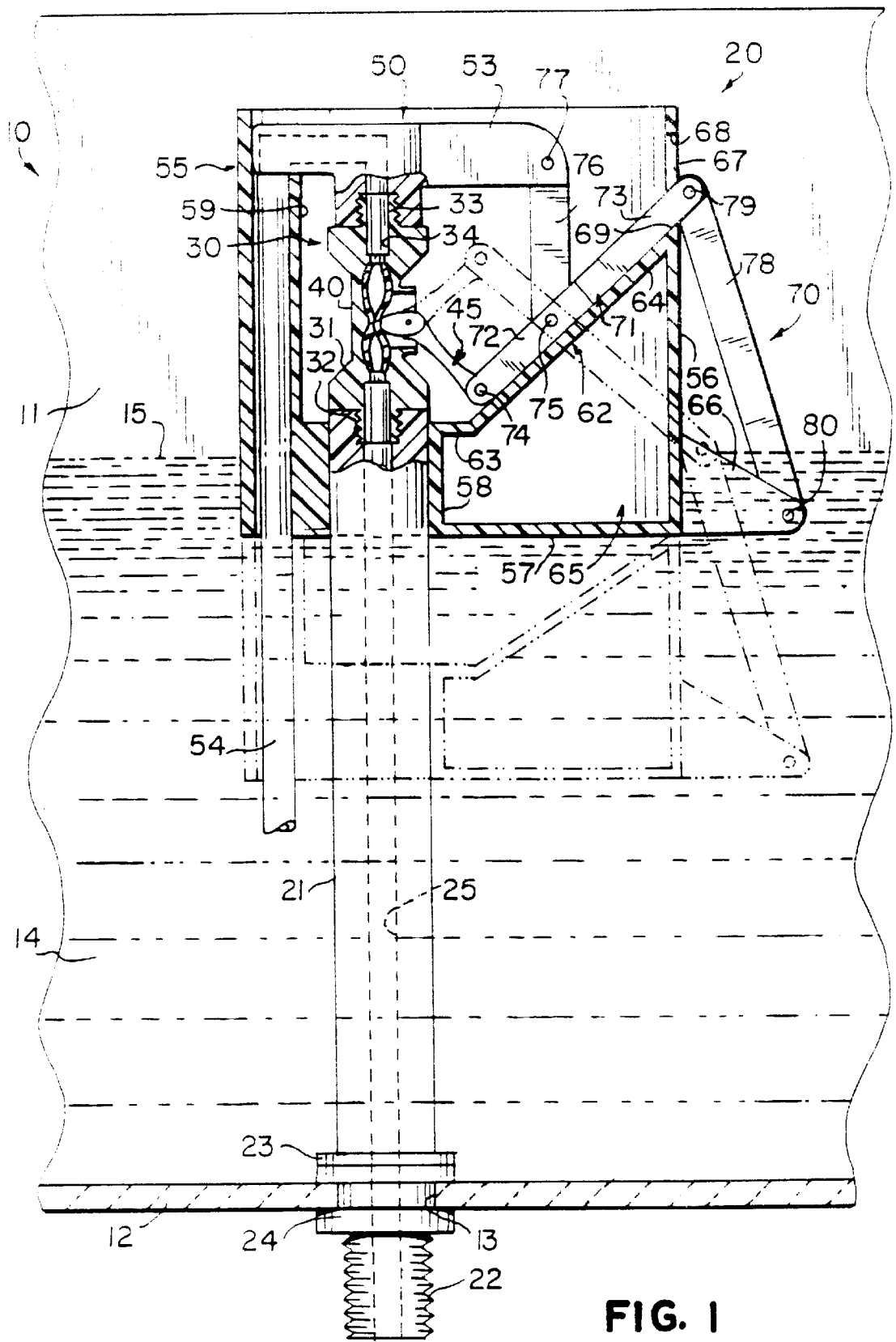
FIG. 1 is a fragmentary sectional view of a flush tank incorporating a liquid level control apparatus in accordance with a first embodiment of the present invention, illustrated partially in side elevation and partially in section.

Referring to FIG. 1, there is illustrated a flush tank, generally designated by the numeral 10, in accordance with a first embodiment of the invention, the tank 10 having a peripheral side wall 11 closed at the lower end thereof by a bottom wall 12 provided with an inlet opening 13. It will be appreciated that the bottom wall 12 will also be provided with a suitable flush valve (not shown) in a known manner. The flush tank 10 is filled to a level 15 with a volume of water 14. The level 15 is variable with operation of the flush tank 10, the level illustrated in FIG. 1 being the maximum or normally full condition of the tank. When the flush valve is operated, water is discharged therethrough from the tank 10, lowering the level 15 to a predetermined minimum level, causing the tank 10 to be automatically refilled through a level control apparatus 20, constructed in accordance with and embodying the features of the present invention.

Figure 7:
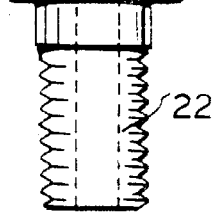
FIG. 7 is a reduced side elevational view of fill tube of the level control apparatus of FIG. 1.

Referring also to FIG. 7, the level control apparatus 20 includes a cylindrical fill tube 21, which is preferably disposed vertically in the tank 10, the tube 21 having an externally threaded lower end 22 which is received through the inlet opening 13 for coupling, by means of a suitable fitting (not shown), to an associated source of water under pressure. The fill tube 21 is provided adjacent to the threaded end 22 with a radially outwardly extending annular flange 23 which seats against the inner surface of the bottom wall 12 of the tank 10. A collar 24 is threadedly engaged with the threaded end 22 of the fill tube 21 for engagement with the outer surface of the tank wall 12 for cooperation with the flange 23 to lock the fill tube 21 in place in the tank 10. The fill tube 21 defines a water inlet conduit 25 and terminates at an internally threaded upper end portion 26.

Figure 8:
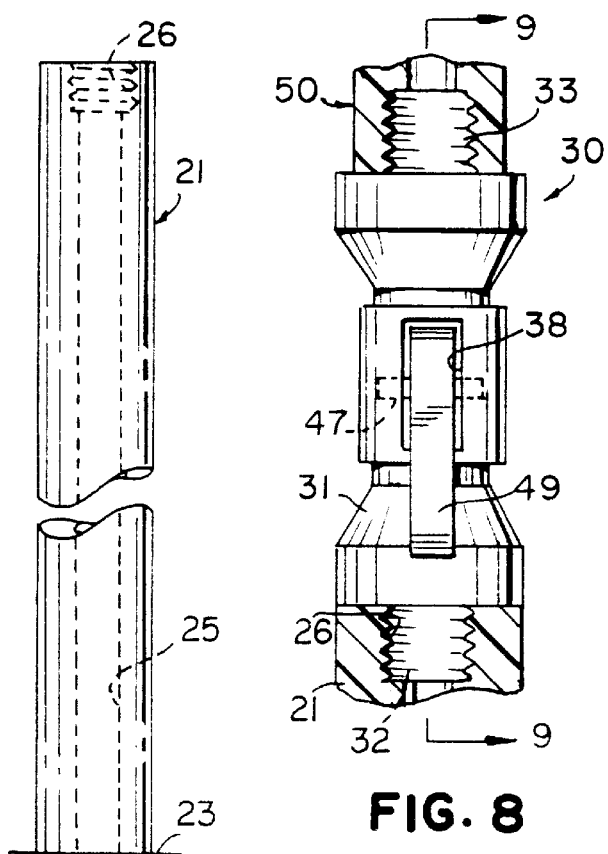
FIG. 8 is an enlarged fragmentary view in partial side elevation and partial section of the valve housing portion of the apparatus of FIG. 1, as viewed from the right-hand side thereof.
Figure 9:
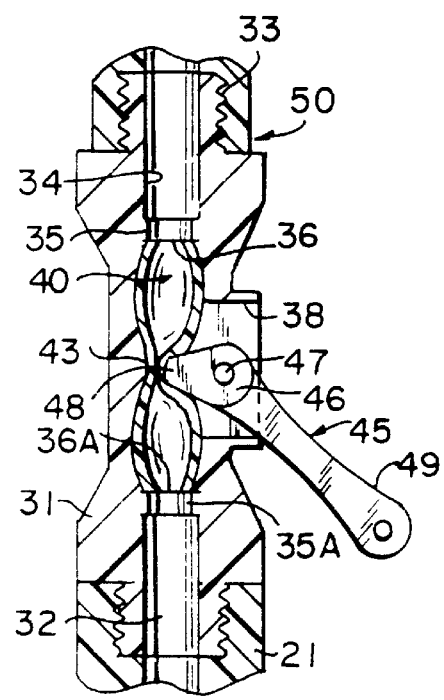
FIG. 9 is a fragmentary sectional view taken along the line 9—9 in FIG. 8.

Referring also to FIGS. 8 and 9, the level control apparatus 20 also includes a valve mechanism 30, including a generally tubular housing 31 provided with externally threaded nipples 32 and 33 at the opposite ends thereof, the nipple 32 being adapted for threaded engagement in the internally threaded end portion 26 of the fill tube 21. The housing 31 defines an axial passage 34 therethrough which communicates with the conduit 25 of the fill tube 21. The passage 34 has reduced-diameter portions respectively defined by radially inwardly extending annular flanges 35 and 35A, the facing surfaces of which define seats 36 and 36A. One side of the passage 34 between the seats 36 and 36A is defined by a support wall 37, the housing 31 being provided with a lateral opening 38 opposite the support wall 37 communicating with the passage 34.

The valve mechanism 30 includes an elongated, flexible, resilient, tubular valve member 40, which is formed of a suitable elastomeric material, and has circularly cylindrical end portions 41 and 42 and a reduced-diameter neck portion 43. The valve member 40 defines a pinch tube and is disposed in the passage 34 against the support wall 37, which is shaped to conform to the shape of the valve member 40. The end portions 41 and 42 are, respectively, seated against the seats 36 and 36A and, in this regard, the passage 34 may be tapered slightly adjacent to the seats 36 and 36A to provide a firm wedge fit of the end portions 41 and 42. When thus mounted in place, the neck portion 43 of the valve member 40 is disposed opposite the aperture 38 in the housing 31. The valve mechanism 30 is actuated by an actuator member 45, which has a head 46 pivotally mounted in the aperture 38 by a suitable pivot pin 47, the head 46 having a tip 48 disposed for engagement with the neck portion 43 of the valve member 40. The actuator member 45 also includes an elongated lever arm 49 which extends laterally outwardly from the aperture 38.

In operation, the actuator member 45 is pivotally movable between a fully closed position, illustrated in FIGS. 8 and 9, and a fully open position (not shown). In the fully closed position, the head tip 48 pinches the adjacent side of the valve member neck portion 43 against the opposite side thereof supported by the support wall 37, for pinching the valve member 40 to a fully closed condition preventing the flow of liquid therethrough. To open the valve, the actuator member 45 is pivoted upwardly or counterclockwise from the FIG. 9 position until the head 46 relieves the valve member 40 from constriction, so as to place the valve member 40 in a fully open condition allowing free and unconstricted flow of liquid therethrough.

Figure 2:
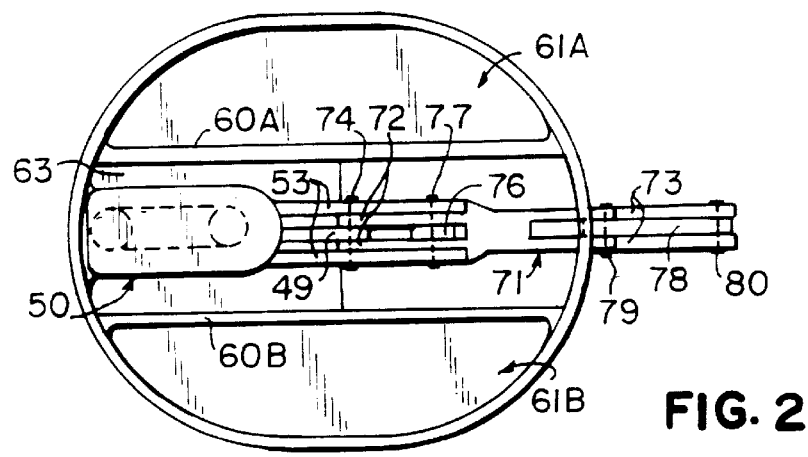
FIG. 2 is a top plan view of the level control apparatus of FIG. 1.
Figure 5:
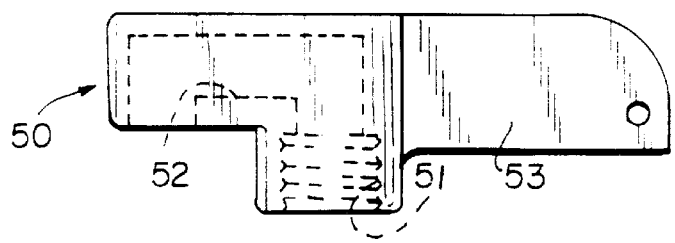
FIG. 5 is an enlarged side elevational view of the head member of the level control apparatus of FIG. 1.
Figure 6:
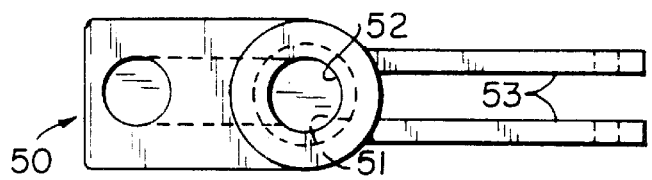
FIG. 6 is a top plan view of the head member of FIG. 5.

Referring also to FIGS. 2, 5, and 6, the level control apparatus 20 includes a head member 50, having a body with an internally threaded portion 51 adapted to threadedly engage with the nipple 33 of the valve mechanism housing 31. The internally threaded portion 51 communicates with a generally inverted U-shaped conduit 52 in the head member 50. The head member 50 also includes a pair of laterally extending clevis arms 53. The conduit 52 exits the head member 50 at an end portion which communicates with a downwardly extending tube 54, which may be fixed to the head member 50 in a suitable manner and extends vertically downwardly alongside the fill tube 21 substantially parallel thereto.

Figure 3:
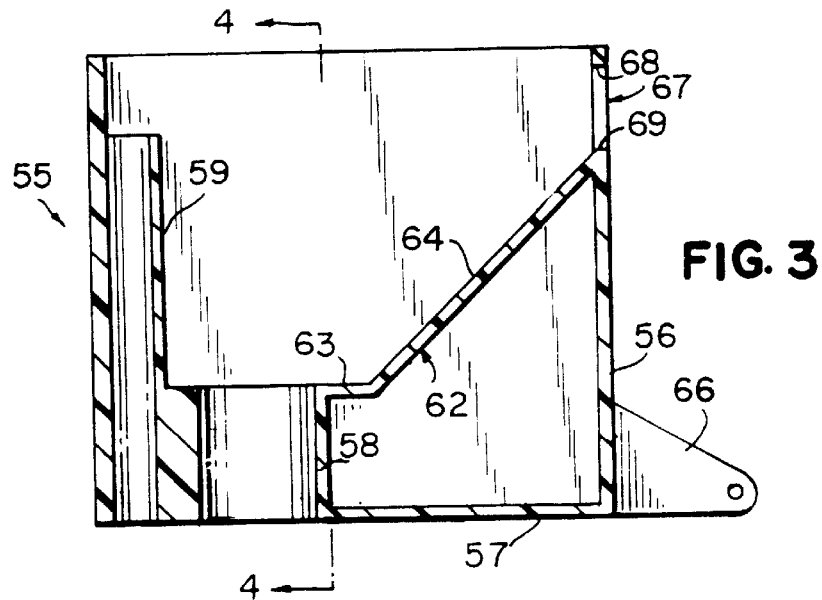
FIG. 3 is a vertical sectional view of the float of the level control apparatus of FIGS. 1 and 2.
Figure 4:
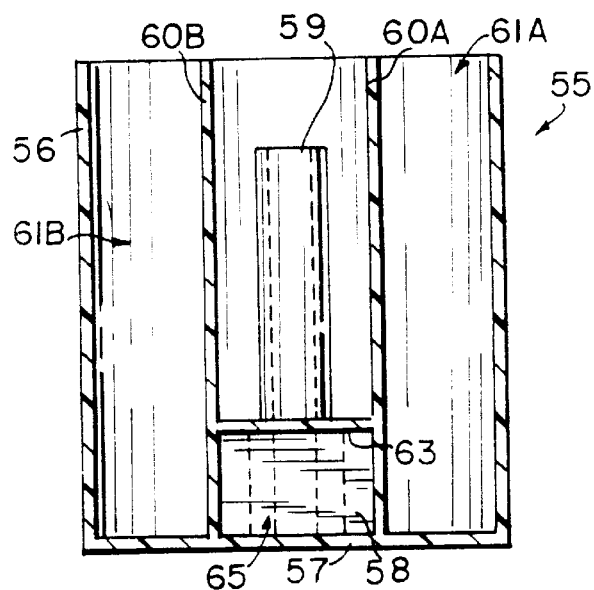
FIG. 4 is a view in vertical section taken along the line 4—4 in FIG. 3.

Referring also to FIGS. 3 and 4, the level control apparatus 20 also includes a float, generally designated by the numeral 55, which has a generally oval-shaped peripheral side wall 56 closed at the bottom thereof by a flat bottom wall 57. The bottom wall 57 has a circular opening therein communicating with an upstanding cylindrical wall 58 dimensioned for slidably receiving therethrough the fill tube 21. Also formed in the bottom wall 57 is a smaller circular opening which communicates with the interior of a cylindrical wall 59, which is integral with the peripheral side wall 56 and is dimensioned to form a sleeve for slidably receiving therethrough the tube 54. In this regard, the cylindrical wall 59 terminates short of the upper end of the peripheral side wall 56 by a distance sufficient to accommodate the head member 50.

The peripheral side wall 56 is spanned by a pair of parallel vertical partitions 60A and 60B, respectively disposed on opposite sides of the cylindrical walls 58 and 59 and respectively cooperating with the peripheral side wall 56 to define air chambers 61A and 61B. Between the vertical partitions 60A and 60B, the peripheral side wall 56 is spanned by a partition 62, which has a horizontal portion 63 disposed at the level of the upper end of the cylindrical wall 58, and an inclined portion 64 which slopes upwardly to join the peripheral side wall 56 a predetermined distance below the upper end thereof at the side thereof opposite the cylindrical wall 59. The partition 62 cooperates with the peripheral side wall 56 and the bottom wall 57 to define an air chamber 65.

Integral with the peripheral side wall 56 at the lower end thereof and projecting laterally outwardly therefrom is a pair of mounting tabs 66 forming a clevis. Formed through the peripheral side wall 56 adjacent to the upper end thereof vertically above the tab 66 is a vertically elongated aperture 67 defining cam surfaces 68 and 69, respectively at the upper and lower edges thereof. It will be appreciated that the chambers 61A, 61B and 65 serve as flotation chambers providing sufficient buoyancy so that the float 55 floats in the liquid 14, being immersed therein to a depth only a fraction of the height of the float 55.

Figure 10:
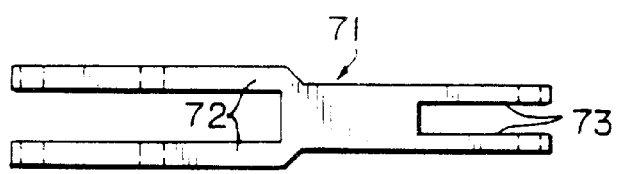
FIG. 10 is a top plan view of a link member of the level control apparatus of FIG. 1.

Referring in particular to FIGS. 1, 2, and 10, the level control apparatus 20 includes a linkage assembly 70 which couples the actuator member 45 to the float 55. The linkage assembly 70 includes an elongated link member 71 having a first pair of clevis arms 72 at one end thereof and a second pair of clevis arms 73 at the other end thereof. The clevis arms 72 receive therebetween the distal end of the lever arm 49 of the actuator member 45 for pivotal connection thereto, as by a pivot pin 74. Also disposed between the clevis arms 72, and pivotally coupled thereto by a pivot pin 75 inboard of the pivot pin 74, is the lower end of a support link 76, the upper end of which is disposed between the clevis arms 53 of the head member 50 for pivotal connection thereto, as by a pivot pin 77. The clevis arms 73 of the link member 71 project outwardly through the aperture 67 in the float 55 and receive therebetween the upper end of an external link 78, being pivotally connected thereto by a pivot pin 79. The lower end of the external link 78 is disposed between the tabs 66 of the float 55, being pivotally connected thereto by a pivot pin 80.

Referring to FIGS. 1 and 9, in operation, the water level 15 in the tank 10 is normally at the position illustrated in solid line in FIG. 1 in the "full" condition. In this condition, the upper end of the cylindrical wall 59 of the float 55 engages the head member 50 and the valve mechanism 30 is disposed in its fully closed condition, being held in that condition by the linkage assembly 70. More specifically, the outer end of the link member 71 is held up by the combined action of the upward force exerted by the float 55 on the link member 78, and the engagement of the float cam surface 69 with the link member 71. This, in turn, holds the distal end of the actuator lever arm 49 down in its fully closed position.

When the flush valve is opened, the water level 15 in the tank 10 drops, allowing the float 55 to drop under the force of gravity, sliding down along the fill tube 21 and the tube 54. As the float 55 drops, the tab 66 pulls downwardly on the link member 71, exerting a downward and laterally outward force on the outer end of the link member 71, tending to pull it outwardly through the aperture 67, thereby tending to pivot the actuator member 45 in a counterclockwise direction from its fully closed position. As the float 55 continues to drop, the cam surface 68 at the upper edge of the aperture 67 will engage the link member 71, exerting further downward pressure on its outer end and continuing the counterclockwise pivoting movement of the actuator member 45, until it reaches a fully open position, illustrated in broken line in FIG. 1, relieving constricting pressure on the valve member 40. This movement of the actuator member 45 is accommodated by the pivotal couplings of the linkage assembly 70.

It will be appreciated that, in standard fashion, the water exits the tank 10 through the flush valve at a much greater rate than it enters through the fill tube 21. Thus, although as soon as the actuator member 45 begins to pivot upwardly the valve member 40 will begin to open, allowing some flow of supply water therethrough, it will have a negligible effect on the water level in the tank 10. Eventually, in standard fashion, after the water level in the tank drops to a predetermined minimum level, in which the float 55 and the linkage assembly 70 are in the positions illustrated in broken line in FIG. 1, the flush valve will automatically close. At this point, water flowing through the now fully open valve member 40, the head member conduit 52 and the tube 54 will begin to refill the tank 10. As the water level rises, it will carry the float 55 upwardly with it, thereby returning the linkage assembly 70 and the valve mechanism 30 to the fully closed conditions illustrated in solid line in FIG. 1. It will be appreciated that, as the water level rises, the valve mechanism 30 will close gradually, as the valve member 40 is pinched closed by the pivoting actuator member 45.

In a constructional model of the invention, the fill tube 21, the housing 31, the actuator member 45, the head member 50, the tube 54, the floats 55 and 155 and the linkage assemblies 70 and 160 are preferably formed of suitable plastic materials. However, it will be appreciated that other materials resistant to corrosion could be used.

Referring now to FIGS. 11A–11E, there is illustrated another embodiment of the level control apparatus, generally designated by the numeral 120. The level control apparatus 120 is substantially the same as the level control apparatus 20, except for the float and the linkage assembly and, accordingly, like parts of the two embodiments have the same reference numbers. The level control apparatus 120 has a float 155 which is similar to the float 55 described above, but it does not have the sloping partition 62 or the lug 66 and the aperture 67 is replaced with a notch 157 formed vertically in the upper edge of the float side wall 56. A lug 158 projects laterally outwardly from the side wall 56 at the lower end of the notch 157.

The level control apparatus 120 has a linkage assembly 160, a portion of which forms a control mechanism 161 which includes a cam member 162 integral with the lug 158. More specifically, the cam member 162 is in the nature of a generally triangular plate lying substantially in a vertical plane which bisects the notch 157 and includes the longitudinal axis of the fill tube 21. The cam member 162 has an inner vertical edge 162a spaced a slight distance from the outer surface of the float side wall 56 and joins the lug 158 at a narrow stem 163. Formed through the cam member 162 is a generally triangular lightening hole 164 and a cam slot 165 bounded on the lower edge thereof by a substantially horizontal lower cam surface 166 which terminates at its outer end in an upwardly curved arcuate stop surface 167 which, in turn, terminates at a cusp 168. The upper portion of the slot 165 is bounded by an upwardly inclined upper cam surface 169 and extends outwardly beyond the cusp 168.

It will be appreciated that the cam member 162 is cantilevered from the lug 158 at the step 163. The cam member 162 is formed of a material which has sufficient resilience and flexibility to permit flexing thereof at the stem 163, as will be explained in greater detail below. Preferably, the cam member 162 is formed unitary with the float 155 and may be formed of a moldable material, such as a suitable plastic.

The linkage assembly 160 also includes a roller 170, which extends through the cam slot 165 and has its opposite ends rotatably mounted in the bifurcated legs of an elongated link 171, which is preferably bifurcated at both ends in a manner similar to the link 71 described above. Thus, the outer end of the link 171 straddles the inner edge 162a of the cam member 162, and the upper bifurcated end of the link 171 straddles the lower end of a support link 173, being pivotally connected thereto at a pivot joint 172. The upper end of the support link 173 is pivoted to the head member 50 at 174. The upper distal end of the link 171 is pivoted at 175 to the outer end of the valve actuator member 45.

The level control apparatus 120 is designed to reduce the time required to fill the tank. Thus, with the level control apparatus 20, described above, because the valve mechanism 30 moves continuously from a fully open position to a fully closed position, the closer it gets to the fully closed position the lower the flow rate of water therethrough. Accordingly, the terminal portion of the filling process can take considerably longer than the initial portion. The level control apparatus 120 serves to speed up the filling process be reducing the amount of time that the valve mechanism 30 spends in nearly closed positions.

Figure 11A:
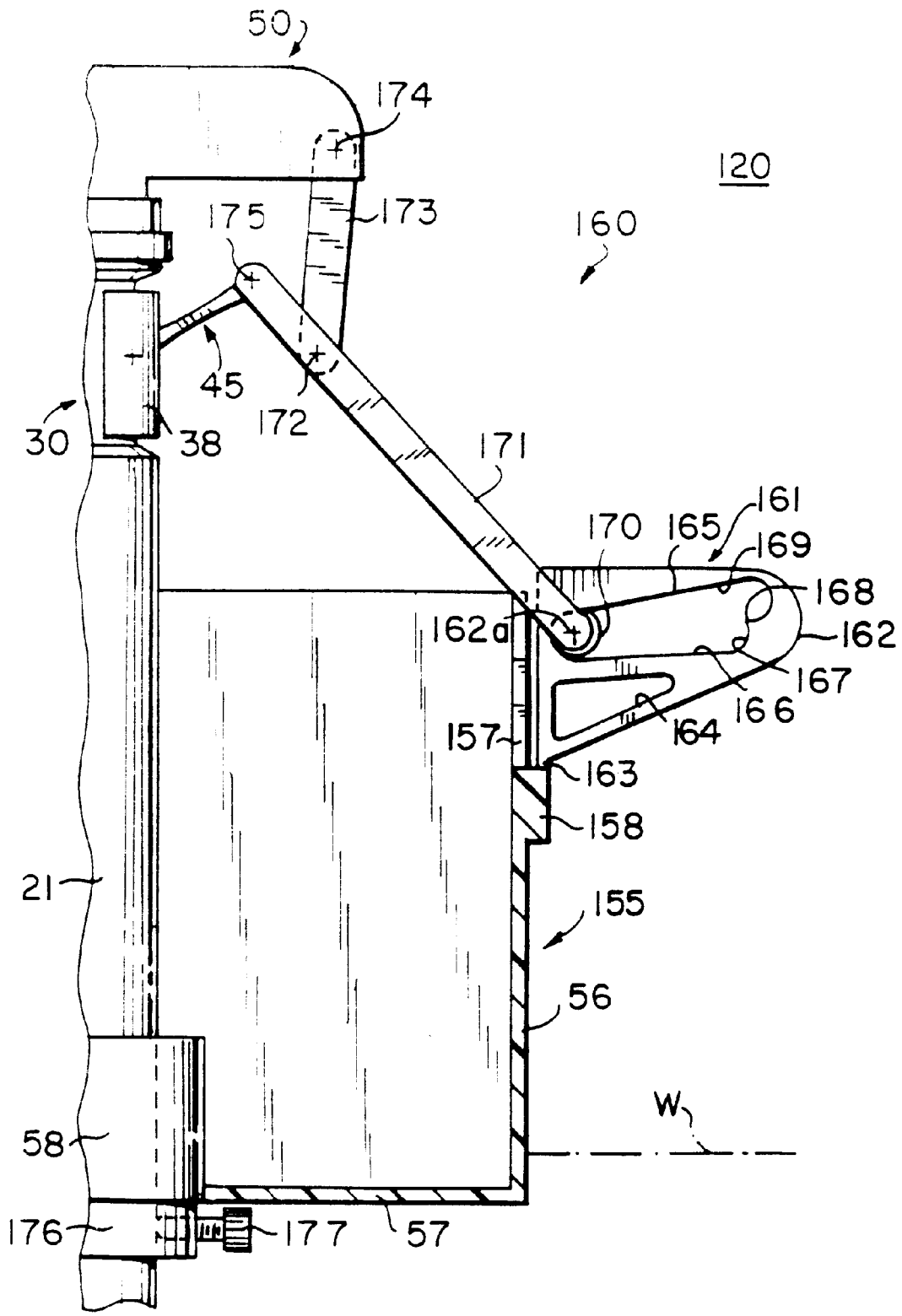
FIGS. 11A–11E are views similar to FIG. 1 of various positions of a second embodiment of the invention.
Figure 11B:
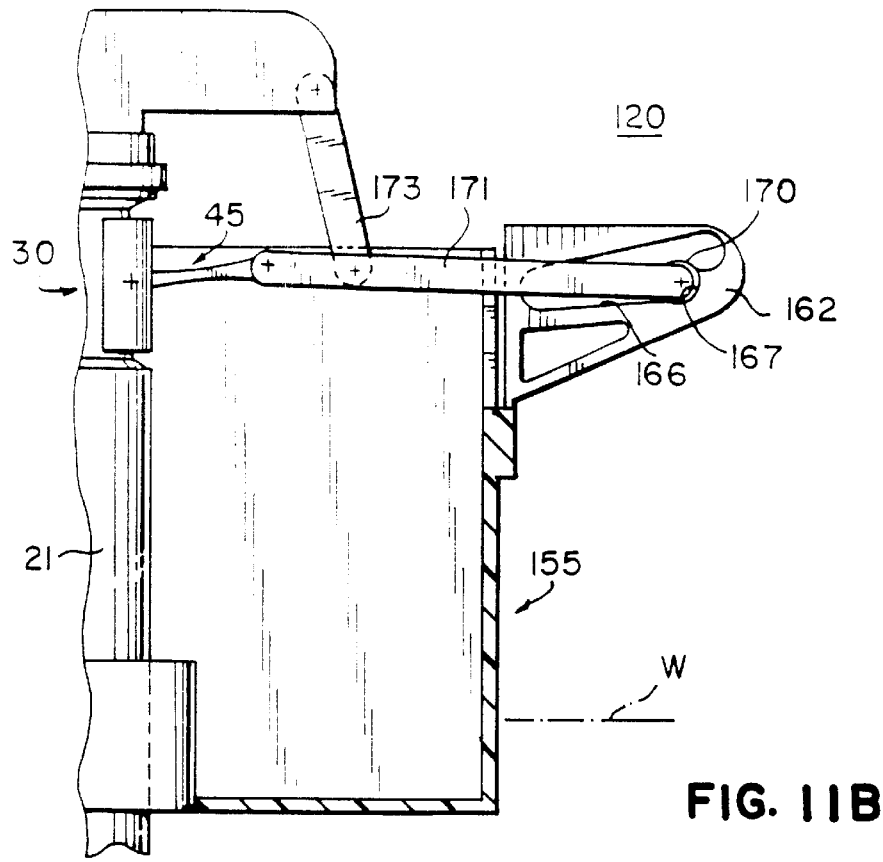

The level control apparatus 120 is illustrated in FIG. 11A in a position when the surface W of the water is at its lowest level after the tank 10 has been flushed. Preferably, a stop ring 176 is fitted around the fill tube 21 and fixed in place by a set screw 177 to limit downward travel of the float 155 at this level. In operation, when the level control apparatus 120 is in the FIG. 11A position, the valve mechanism 30 is in its fully open position allowing water to flow into the tank 10 at its maximum rate. In this position the cam follower roller 170 is at the innermost end of the cam slot 165. As the water level rises, the float 155 begins to float and the roller 170 is cammed along the lower cam surface 166 until, when the water level has reached the position illustrated in FIG. 11B, the roller 170 stops against the stop surface 167, the curvature and length of which are such that the roller 170 cannot cam past the cusp 168. Thus, continued movement of the float 155 and the linkage assembly 160 are arrested at the FIG. 11B position. At this position the valve mechanism 30 has been partially closed, but there is still a substantial flow of water into the tank.

Figure 11C:
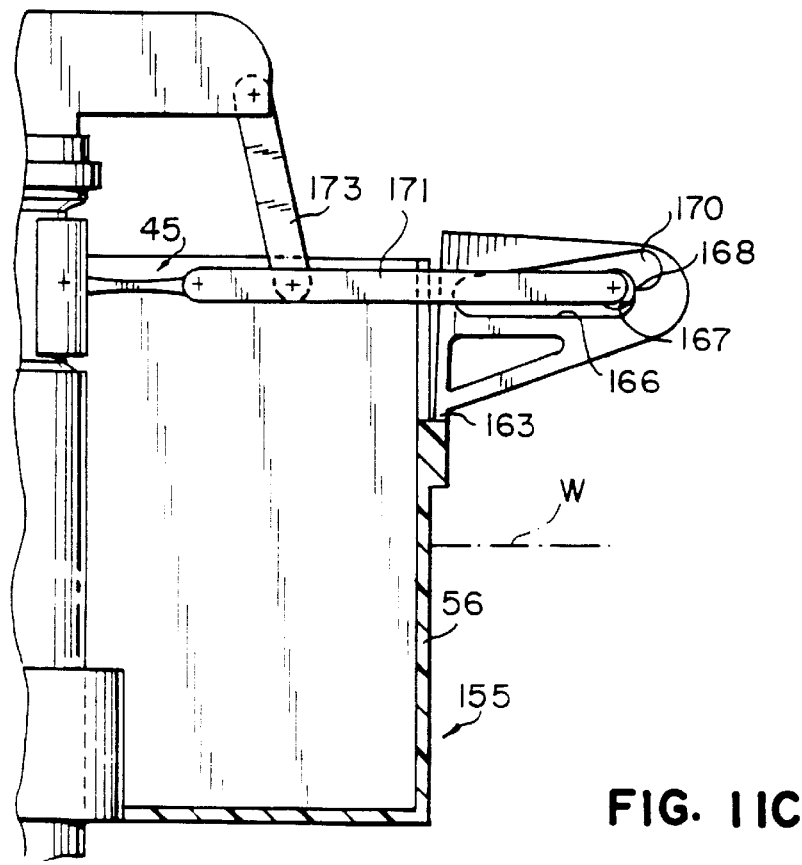
Figure 11D:
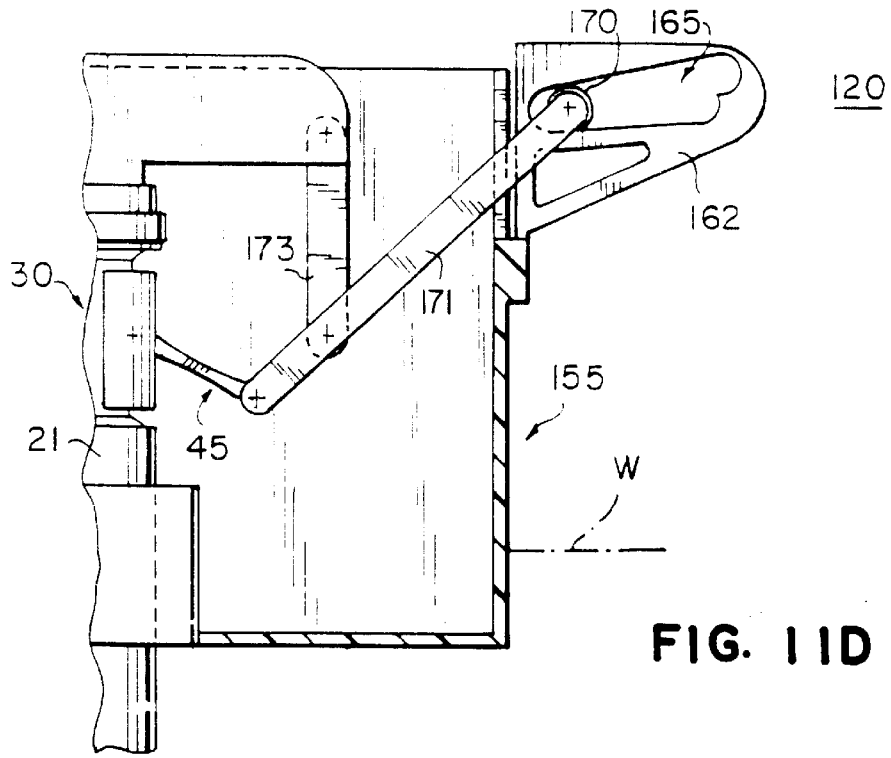

Thus, the water level continues to rise along the outside of the float 155 until it reaches a predetermined level, illustrated in FIG. 11C, substantially at the highest or filled level of the tank. At this point the buoyancy force exerted on the float 155 is such that the cam member 162 yields at the stem 163, tilting outwardly away from the float wall 56, as illustrated in FIG. 11C, sufficiently for the roller 170 to clear the cusp 168. This allows the roller 170 to move into the upper part of the cam slot 165, releasing the float 155 and the linkage assembly 160 to jump suddenly to the position illustrated in FIG. 11D, shutting off the valve mechanism 30 in a sudden snap action. Thus, it will be appreciated that water is allowed to flow at a substantial rate into the tank 10 until the tank is nearly full, substantially reducing the time required to fill the tank.

Figure 11E:
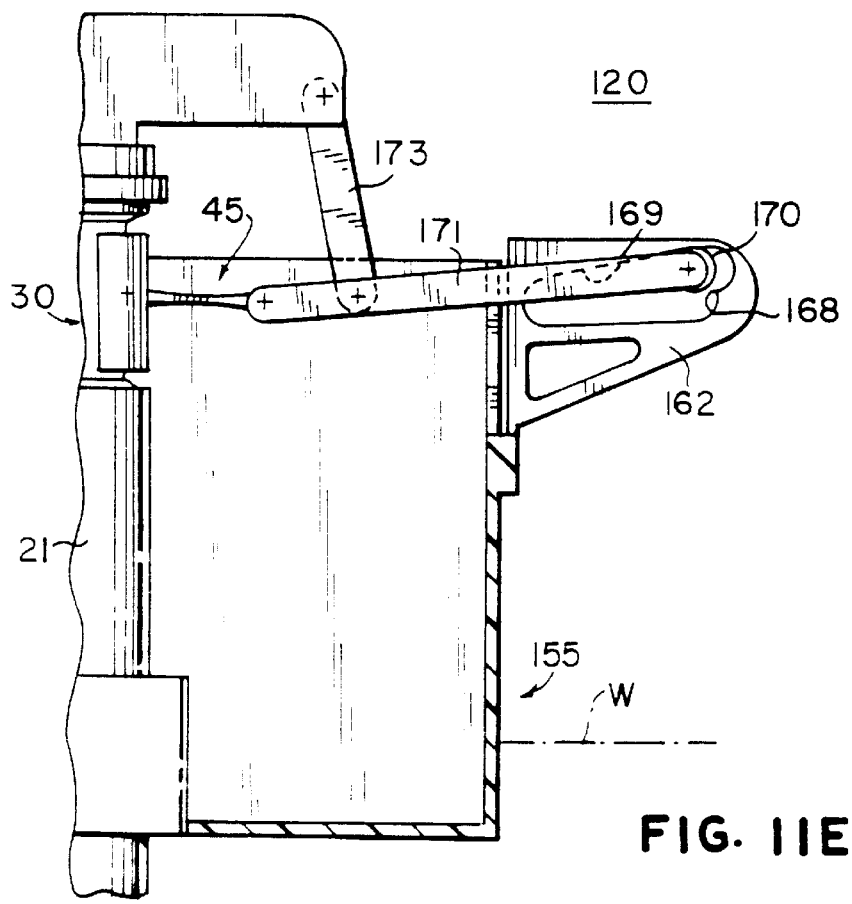

When the tank is again flushed, the float 155 drops with the water level in the usual manner. As it does so, the roller 170 is cammed along the upper cam surface 169 of the cam slot 165, as illustrated in FIG. 11E, which extends outwardly beyond the cusp 168. As the link 171 moves past horizontal, the roller 170 will begin to roll back inwardly along the upper cam surface 169 until it reaches the inner end of the cam slot 165 when the float 155 returns to its lowest level of FIG. 11A. It will be appreciated that, as the float 155 moves downwardly from the FIG. 11D position, the valve mechanism 30 will be gradually opened, as was explained above in connection with the level control apparatus 20 to refill the tank.

Referring now to FIGS. 12–17, there is illustrated another embodiment of the level control apparatus, generally designated by the numeral 220 which, like the level control apparatus 120 of FIGS. 11A–11E, provides snap-action shutoff of the valve, but which provides a simpler and more economical construction.

The level control apparatus 220 includes a fill valve mechanism 230, including a generally tubular housing 231, which preferably includes two substantially mirror-image halves 232, secured together, as by ultrasonic weldments at 233. The housing 231 defines an axial passage in which the tubular valve member 40 is received. The opposite ends of the valve member 40 respectively communicate with conduits 234 and 235, respectively formed in end blocks 236 and 237 fixedly secured to the opposite ends of the housing 231. Formed in the underside of the housing 231 and extending vertically upwardly substantially half the height thereof is a rectangular slot 238, which exposes the neck portion 43 of the valve member 40. The conduit 235 communicates with the upper end of the downwardly extending tube 54, while the conduit 234 communicates with the fill tube 21 through a cylindrical control extension 240.

Figure 13:
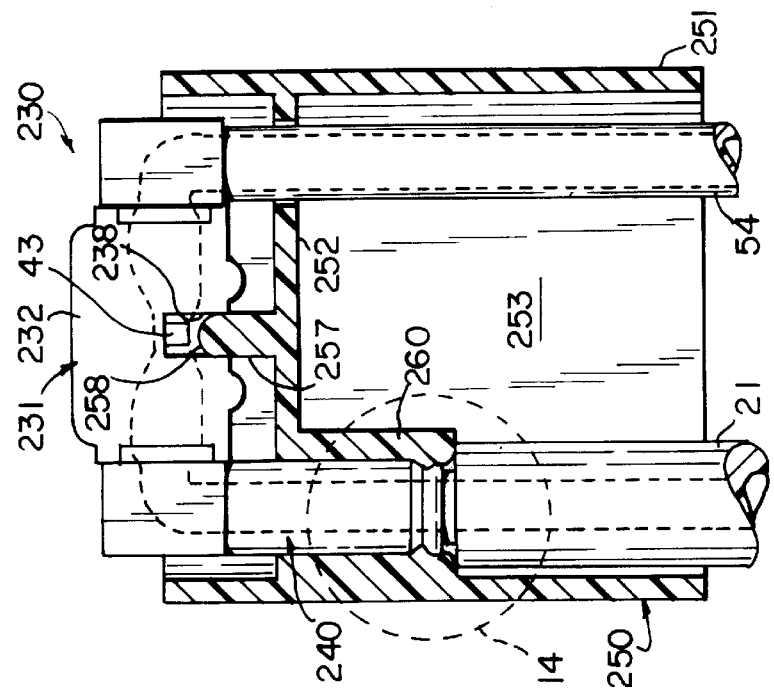
FIGS. 12 and 13 are fragmentary sectional views of a liquid level control apparatus in accordance with a third embodiment of the invention, respectively illustrating the apparatus in its valve-closed and valve-open positions.
Figure 14:
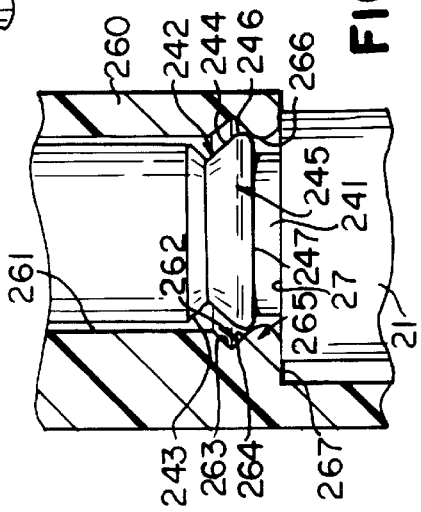
FIG. 14 is an enlarged, fragmentary, sectional view of a portion of FIG. 13.
Figure 12:
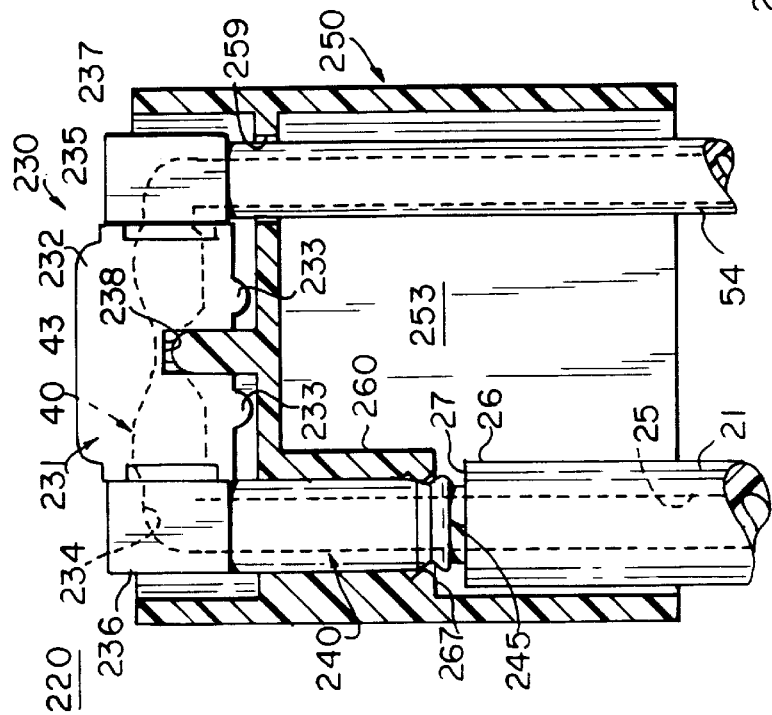

Referring in particular to FIGS. 12–14, the control extension 240 preferably has an externally threaded lower end 241, which is threadedly engageable in the internally threaded upper end portion 26 of the fill tube 21. The upper end of the control extension 240 is fixed to the end block 236 by suitable means, so as to provide a tubular passage providing communication between the conduit 234 and the inlet conduit 25 defined by the fill tube 21. Formed around the control extension 240 adjacent to the externally threaded end 21 thereof is an annular groove 242, which is generally V-shaped in transverse cross section and defines an upwardly and outwardly sloping stop surface 243 and a downwardly and outwardly retaining surface 244. The retaining surface 244 also constitutes the upper surface of an annular flange 245, which has a radiused or arcuate outer end 246 which projects radially outwardly of the control extension 240, the flange 245 also defining an annular, planar arresting shoulder surface 247 lying in a plane substantially perpendicular to the longitudinal axis of the control extension 240.

Figure 15:
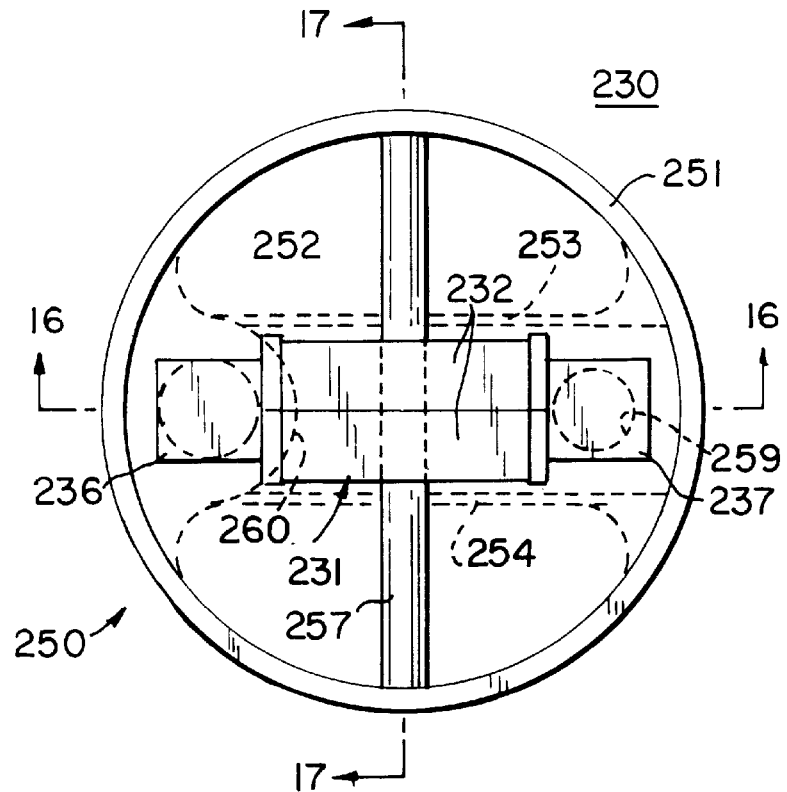
FIG. 15 is a top plan view of the level control apparatus of FIG. 12.
Figure 16:
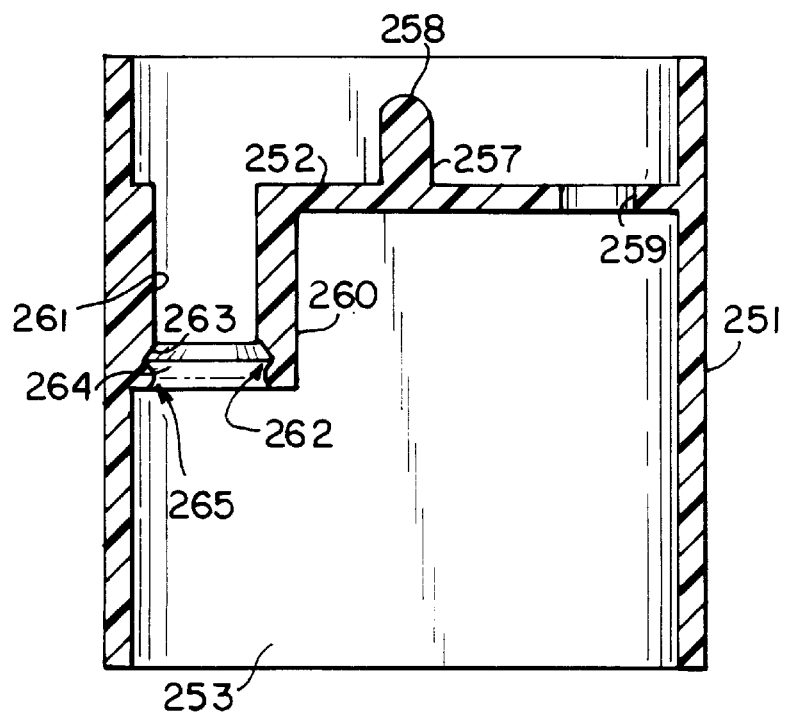
FIG. 16 is a view in vertical section of the float of the level control apparatus of FIG. 15, taken generally along the line 16—16 therein.
Figure 17:
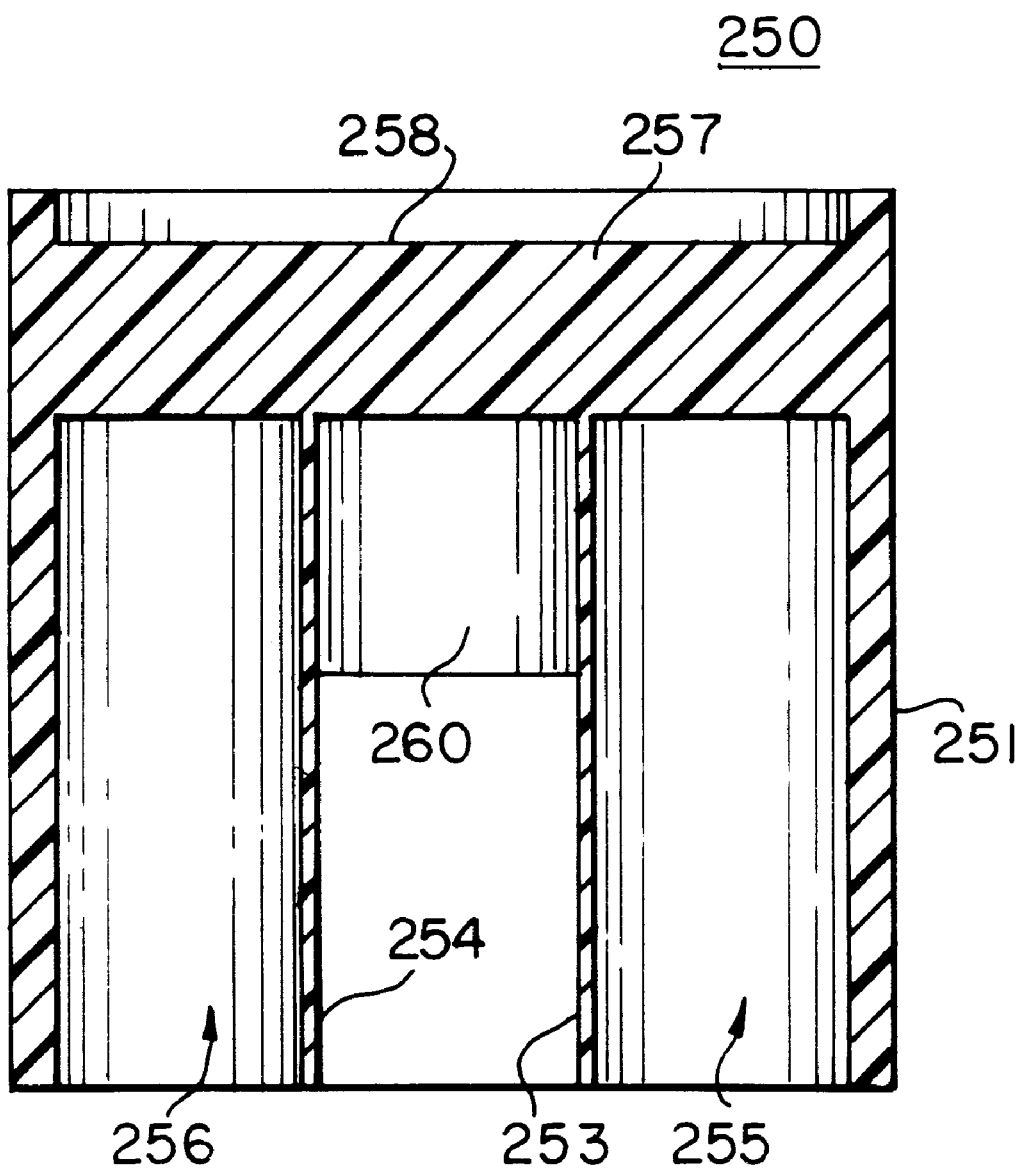
FIG. 17 is a vertical sectional view of the float of the level control apparatus of FIG. 15, taken generally along the line 17—17 therein.

Referring now also to FIGS. 15–17, the level control apparatus 220 also includes a float 250 which has a generally circularly cylindrical peripheral side wall 251 closed near the upper end thereof by an upper wall 252, which extends substantially perpendicular to the longitudinal axis of the peripheral side wall 251. Extending downwardly from the upper wall 252 substantially perpendicular thereto are two partition walls 253 and 254, which are substantially parallel to each other and which extend across chords of the peripheral side wall for cooperation therewith to define two air chambers 255 and 256. Integral with the upper wall 252 and extending vertically upwardly therefrom and substantially diametrically thereacross, perpendicular to the partition walls 253 and 254, is an upstanding actuator rib 257 having an arcuate radiused upper end 258. A circular aperture 259 is formed through the upper wall 252 for slidably receiving the downwardly extending tube 54.

Depending from the upper wall 252 is a circularly cylindrical wall 260, which defines a control passage 261 dimensioned to slidably receive the control extension 240 therethrough. Formed on the inner surface of the control passage 261 adjacent to the lower end thereof is an annular groove 262, which is substantially V-shaped in transverse cross section and defines an upwardly and inwardly inclined stop surface 263 and a downwardly and inwardly sloping arresting surface 264, the latter also forming the upper surface of an annular flange 265 which has an inner end 266 which is radiused or arcuate in transverse cross section. The radiused end 266 joins an annular end surface 267 of the cylindrical wall 260, which is a substantially planar surface lying in a plane disposed substantially perpendicular to the longitudinal axis of the control passage 261. The flange 265 has an inner diameter which is slightly less than the diameter of the control passage 261.

In use, the float 250 is fitted over the downwardly extending tube 54 and the control extension 240, as illustrated in FIGS. 12 and 13. The cylindrical wall 260 is sufficiently flexible and resilient to permit the flange 265 thereof to be forced past the flange 245 on the control extension 240 to the position illustrated in FIG. 13, wherein the flange 265 is stopped against an upper end surface 27 of the fill tube 21. The valve mechanism housing 231 and its attached end blocks 236 and 237 are then fitted in place, with the blocks 236 and 237 respectively secured to the control extension 240 and the tube 254, and with the upper end of the actuator rib 257 of the float 250 being received in the lower end of the valve housing slot 238. In this configuration, the actuator rib 257 does not engage the valve member 40, so that the valve is fully open. Preferably, the flange 265 of the control passage 261 is spaced slightly below the flange 245 of the control extension 240.

In operation, it will be appreciated that the parts will be in the configuration illustrated in FIG. 13 when the flush tank is substantially empty after the flush valve has been operated. Water will flow through the fill tube 21 and the tube 54 into the flush tank in the direction of the arrows in FIG. 13 to begin refilling the tank. When the water level rises above the lower end of the float 250 it will close the lower ends of the air chambers 255 and 256, trapping air therein and exerting a buoyancy force on the float 250 and raising it slightly until the float flange 265 engages the flange 245 of the control extension 240 to arrest further upward movement of the float 250. In this position, the actuator rib 257 may slightly engage the valve member 40, but the valve will remain substantially completely opened to continue rapid refilling of the tank.

When the water level has risen along the arrested float 250 to substantially its maximum level it will exert a sufficient buoyancy force on the float 250 to cause the radiused inner end 246 of the flange 245 to cam past the radiused inner end 246 of the flange 245, causing the float 250 to jump suddenly to the position illustrated in FIG. 12 fully closing the valve member 40. In this regard, it will be appreciated that the cylindrical wall 260 of the float 250 has sufficient flexibility and resilience to permit yielding of the parts to allow this camming action to occur. Upward movement of the float 250 is limited by engagement of the arresting surface 264 on the flange 265 with the stop surface 243 on the control extension 240. When the water level again drops after the flush valve is actuated, the weight of the float 250 will allow it to cam back past the control extension flange 245 to the fully open valve position of FIG. 13. In this regard, preferably the slopes of the surfaces of the flanges 245 and 265 are so arranged that less force is required for the flange 265 to move past the flange 245 in a downward direction than in an upward direction.

Preferably, the float 250 is formed of a suitable plastic material and is of unitary, one-piece molded construction. The valve housing 231 and the control extension 240 may also be formed of suitable plastic materials.

From the foregoing, it can be seen that there has been provided an improved liquid level control apparatus for a flush tank which occupies minimal space in the tank and is of relatively simple and economical construction, while affording smooth valve operation. There has also been provided an apparatus of the type set forth which permits relatively rapid refilling of the tank and quick, positive shutoff of the valve.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A liquid level control apparatus for a flush tank containing liquid varying between highest and lowest levels and including a fill tube communicating with the tank and with a source of liquid under pressure, said apparatus comprising:

a valve mechanism communicating with the fill tube and operable between open and closed conditions relative to the fill tube, a float disposed in the liquid in the tank for movement in response to changes in the liquid level in the tank, an actuator member coupled to said valve mechanism and to said float for actuating said valve mechanism between its open and closed conditions in response to movement of the float, and control mechanism including a first arresting portion contiguous with a wall portion of the float and a second arresting portion cooperatively associated with the float, said control mechanism being responsive to rising of the float to a predetermined stop level intermediate the highest and lowest levels for moving to a stop condition with said first arresting portion engaging said second arresting portion for mechanically arresting further upward movement of the float, said control mechanism, when in the stop condition, being responsive to a predetermined buoyancy force exerted on the arrested float when the liquid has risen substantially to the highest level for shifting to a release condition by disengagement of the first arresting portion from the second arresting portion for releasing the float and permitting the float and the actuator member to move suddenly to actuate the valve mechanism to its closed condition.

2. The apparatus of claim 1, wherein said control mechanism includes a flexible and resilient portion yieldable to accommodate movement between said stop and release conditions.

3. The apparatus of claim 1, wherein said valve mechanism includes a flexible and resilient tubular valve member communicating with the fill tube.

4. The apparatus of claim 3, wherein said actuator member is engageable with said valve member and movable between an open position wherein said valve member is in a fully open condition substantially unconstricted for accommodating free flow of liquid therethrough and a fully closed position pushing said valve member to a fully closed condition blocking the flow of liquid therethrough, the flow of liquid through said valve member being continuously variable between the fully open and closed conditions of said valve member.

5. The apparatus of claim 1, and further comprising guide structure for constraining said float to substantially vertical movement.

6. The apparatus of claim 5, wherein said float has a cylindrical portion receiving the fill tube coaxially therethrough.

7. The apparatus of claim 6, wherein the flush tank includes a second tube communicating with the fill tube and extending substantially parallel thereto, said float having an aperture receiving said second tube therethrough.

8. The apparatus of claim 5, wherein said actuator member is integral with said float.

9. The apparatus of claim 8, wherein said first arresting portion includes a cam member cantilevered from said float and said second arresting portion includes a cam follower coupled to the remainder of the linkage.

10. The apparatus of claim 9, wherein said cam member includes an elongated slot defining a cam surface and said cam follower includes a roller movable along said cam surface, said cam surface having a stop portion engageable with said cam follower in said stop condition to arrest movement of the cam follower, movement of said control mechanism to the release condition shifting the position of said stop surface to permit said cam follower to move past said stop surface.

11. The apparatus of claim 1, wherein actuator member is pivotally movable between the opened and closed positions of said valve mechanism.

12. The apparatus of claim 11, wherein said control mechanism includes a first link pivotally connected to said actuator member and connected to said second arresting portion and a support link carried by said valve mechanism and pivotally connected to said first link between said actuator member and said second arresting portion.

13. The apparatus of claim 1, wherein said float has a substantially cylindrical outer wall with an aperture therein through which said actuator linkage extends.

14. The apparatus of claim 1, wherein said valve mechanism includes a flexible and resilient tubular valve member communicating with the fill tube and disposed substantially vertically in use.

15. A liquid level control apparatus for a flush tank containing liquid varying between highest and lowest levels and including a fill tube communicating with the tank and with a source of liquid under pressure, said apparatus comprising:

a valve mechanism communicating with the fill tube and operable between open and closed conditions relative to the fill tube, a float disposed in the liquid in the tank for movement in response to changes in the liquid level in the tank, an actuator member integral with said float and disposed for engagement with said valve mechanism for actuating said valve mechanism between its open and closed conditions in response to movement of the float, and control mechanism including a first arresting portion integral with the float and a second arresting portion disposed on the fill tube, said control mechanism being responsive to rising of the float to a predetermined stop level intermediate to the highest and lowest levels for moving to stop condition with said first arresting portion engaging said second arresting portion for mechanically arresting further upward movement of the float, said control mechanism, when in the stop condition, being responsive to a predetermined buoyancy force exerted on the arrested float when the liquid has risen substantially to the highest level for shifting to a release condition by disengagement of the first arresting portion from the second arresting portion for releasing the float and permitting the float and the actuator member to move suddenly to actuate the valve mechanism to its closed condition.

16. The apparatus of claim 15, wherein said actuator member is unitary with said float.

17. The apparatus of claim 15, wherein said float has a cylindrical portion receiving the fill tube coaxially therethrough for movement relative to the fill tube, said first arresting portion being formed on an interior surface of said cylindrical portion and said second arresting portion being formed on an exterior surface of the fill tube.

18. The apparatus of claim 17, wherein said first arresting portion includes an annular flange on said cylindrical portion and said second arresting portion includes an annular flange on said fill tube.

19. The apparatus of claim 18, and further comprising a stop surface on the fill tube engageable with the cylindrical portion for limiting downward movement of the float.

20. The apparatus of claim 15, wherein said valve mechanism includes a flexible and resilient tubular valve member disposed substantially horizontally in use.

21. The apparatus of claim 20, wherein said valve mechanism includes a housing substantially surrounding said valve member and having an access slot therein, said actuator member including a raised rib on said float receivable in said slot for engaging said valve member.

* * * * *

UNITED STATES PATENT AND TRADEMARK OFFICE
CERTIFICATE OF CORRECTION

PATENT NO. : 6,123,099
DATED : September 26, 2000
INVENTOR(S) : Harry W. Edwards Page 1 of 1

It is certified that error appears in the above-identified patent and that said Letters Patent is hereby corrected as shown below:

Column 11,
Line 25, replace "Claim 8" with -- Claim 1 --.
Lines 28 to 29, delete "coupled to the remainder of the linkage".

Signed and Sealed this

Twelfth Day of March, 2002

Attest:

Attesting Officer

JAMES E. ROGAN
Director of the United States Patent and Trademark Office